United States Patent
Farhan et al.

(10) Patent No.: US 8,327,177 B2
(45) Date of Patent: Dec. 4, 2012

(54) SYSTEM AND METHOD FOR INFORMATION HANDLING SYSTEM STORAGE DEVICE POWER CONSUMPTION MANAGEMENT

(75) Inventors: Munif Farhan, Round Rock, TX (US); Chanik Park, Gyeonggi-do (KR); Myung Hyun Jo, Gyeonggi-do (KR)

(73) Assignees: Dell Products L.P., Round Rock, TX (US); Samsung Electronics Co., Ltd., Gyeonggi-Do (KR)

( * ) Notice: Subject to any disclaimer, the term of this patent is extended or adjusted under 35 U.S.C. 154(b) by 287 days.

(21) Appl. No.: 12/781,090

(22) Filed: May 17, 2010

(65) Prior Publication Data

US 2011/0283128 A1 Nov. 17, 2011

(51) Int. Cl.
*G06F 1/32* (2006.01)
(52) U.S. Cl. ....................................................... 713/324
(58) Field of Classification Search ................... 713/324
See application file for complete search history.

(56) References Cited

U.S. PATENT DOCUMENTS

| | | | | |
|---|---|---|---|---|
| 5,517,649 | A | * | 5/1996 | McLean ........................ 713/323 |
| 5,682,273 | A | * | 10/1997 | Hetzler ............................ 360/75 |
| 6,049,822 | A | | 4/2000 | Mittal |
| 7,669,019 | B2 | * | 2/2010 | Fujibayashi et al. .......... 711/161 |
| 2004/0015731 | A1 | * | 1/2004 | Chu et al. ...................... 713/300 |

FOREIGN PATENT DOCUMENTS

| | | |
|---|---|---|
| JP | H11-282568 | 10/1999 |
| JP | 2008-146189 | 6/2008 |
| KR | 10-0319600 B1 | 12/2001 |
| KR | 10-2007-003534 A | 3/2007 |

* cited by examiner

*Primary Examiner* — Kim Huynh
*Assistant Examiner* — Eric Chang
(74) *Attorney, Agent, or Firm* — Hamilton & Terrile, LLP; Robert W. Holland

(57) ABSTRACT

A storage device, such as a hard disk drive or solid state drive, reduces energy consumption by entering a reduced power state after an inactivity time where the inactivity time is set based upon I/O commands received at the storage device. For example, where commands received at a storage device are characterized in a predetermined way in terms of read commands, such as a last received command as a read command or a ratio of read commands versus write commands, a first inactivity time is applied, while commands characterized in a predetermined way in terms of write commands have a second inactivity time applied. Using a greater inactivity time during read activities than during write activities provides improved performance with reduced power consumption.

19 Claims, 2 Drawing Sheets

SYSTEM AND METHOD FOR INFORMATION HANDLING SYSTEM STORAGE DEVICE POWER CONSUMPTION MANAGEMENT

BACKGROUND OF THE INVENTION

1. Field of the Invention

The present invention relates in general to the field of information handling system storage devices, and more particularly to a system and method for information handling system storage device power consumption.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include non-volatile storage devices that store information, such as an operating system, applications and user data. One common non-volatile storage device is a hard disk drive (HDD), which spins a magnetic disk relative to a head that reads and writes information at the disk. Another type of non-volatile storage device is a solid state drive (SSD). Solid state drives differ from hard disk drives by using non-volatile flash memory to store information rather than a spinning magnetic disk. Because solid state drives do not have moving mechanical parts, they tend to have quicker start-up and reduced power consumption relative to hard disk drives. The reduced power consumption of solid state drives make them an attractive alternative for portable information handling systems. Portable information handling systems sometimes operate using an internal power source, such as a rechargeable battery. Reduced power consumption by a solid state drive helps to increase the amount of time that the information handling system will run on a battery charge.

Information handling systems also typically include a variety of power saving techniques that help reduce overall power consumption and thus increase battery charge life of a portable information handling system. For example, a power manager executing as firmware within a chipset, such as a BIOS, will instruct subsystems of an information handling system to implement a low power state when the subsystem is inactive. A low power transition timer typically monitors the subsystem for activity and initiates a transition to a low power state after a set amount of time without subsystem activity. Power management engineers attempt to set the timer so that power consumption and system performance have an effective balance. For example, power down of a hard disk drive might include power down of the magnetic disk so that it does not spin. Power up of the hard disk drive has a recovery time that includes time needed to spin up the magnetic disk. Power down of the magnetic disk after too short of an inactivity period will decrease system performance due to excessive recovery times associated with magnetic disk spin-up. Solid state drives generally have a more rapid recovery than hard disk drives since solid state drives do not have mechanically moving parts that have to power up before the solid state drive can read or write information. Both hard disk drives and solid state drives when operating within an information handling system generally do not know when the host information handling system transitions to an idle state and thus enter a reduced power state if the host I/O activity does not exist for an inactivity time period. Selecting an appropriate inactivity time period presents a difficulty in that too short of an inactivity time will impact performance while too long of an inactivity time before transition to a reduced power state will result in unnecessary power consumption.

SUMMARY OF THE INVENTION

Therefore a need has arisen for a system and method which sets an inactivity time period for transition of a storage device to a reduced power state that provides an appropriate balance between power consumption and system performance.

In accordance with the present invention, a system and method are provided which substantially reduce the disadvantages and problems associated with previous methods and systems for setting an inactivity time period for transition of a storage device to a reduced power state. The inactivity time period is set to selected of plural inactivity times based upon I/O commands received at the storage device, such as a first inactivity time based on read commands and a second inactivity time based on write commands. The storage device transitions to a reduced power state if idle for the selected inactivity time, such as when no I/O commands are received at the storage device for the selected inactivity time.

More specifically, an information handling system is built from plural processing components, such as a CPU and RAM having operations coordinated through a chipset executing firmware, such as a BIOS. A storage device interfaces with the processing components to provide permanent storage in non-volatile memory, such as in flash memory of a solid state drive or a magnetic disk of a hard disk drive. A power manager executing on the storage device, such as a controller of the storage device, monitors I/O commands received at the storage device to select an inactivity time for use at the storage device. An inactivity timer of the power manager compares idle time at the storage device, such as the time since the last received I/O command at the storage device, with the selected inactivity time provided by an inactivity time manager. If the idle time meets or exceeds the inactivity time, then the power manager commands a power down state at the storage device. A first inactivity time is selected for received I/O commands associated with reads from the storage device and a second inactivity time is selected for received I/O commands associated with writes from the storage device.

The present invention provides a number of important technical advantages. One example of an important technical advantage is that an appropriate balance is achieved between power consumption and system performance for information handling systems having storage devices that transition to reduced power states based upon received host I/O command, such as a write command versus a read command. By analyzing host I/O commands, a storage device predicts the likelihood that additional commands or idle time is coming and adjusts power down state transitions accordingly so that enhanced performance is available with reduced power consumption. In one embodiment, an information handling system having a six cell battery saved 15 minutes of battery time over a charge life by adjusting an inactivity timer to transition a storage device to a power down state based on the type of host I/O commands received at the storage device, such as a read command versus a write command.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Adjusting an inactivity timer of a storage device based upon I/O commands received from a host information handling system provides transitions to a reduced power state after an idle time of the inactivity timer so that performance and power consumption are appropriately balanced. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
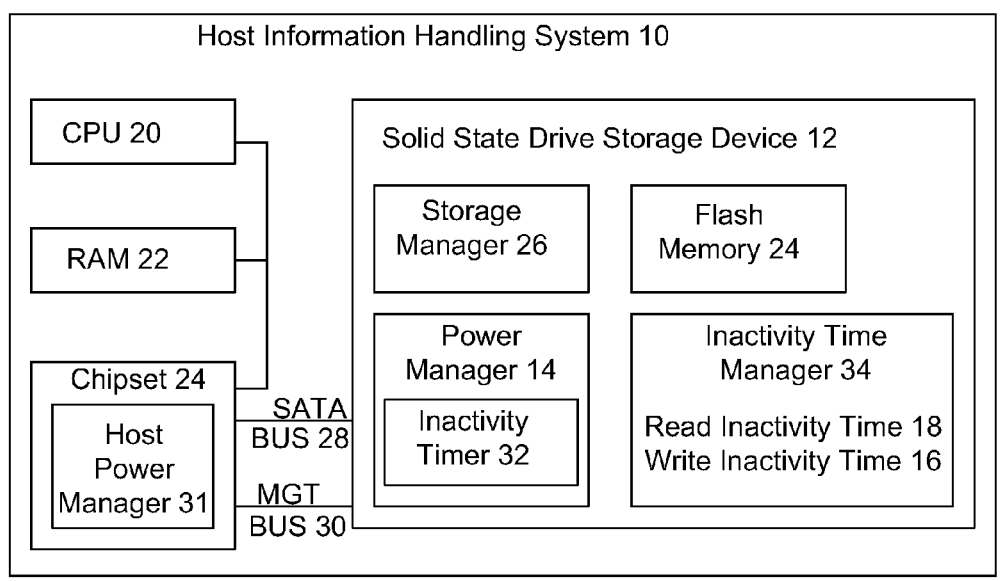
FIG. 1 depicts a block diagram of an information handling system having a storage device with a power manager that uses a first inactivity timer for idle periods associated with write commands and a second inactivity time for idle periods associated with read commands.

Referring now to FIG. 1, a block diagram depicts an information handling system 10 having a storage device 12 with a power manager 14 that uses a first inactivity time 16 for idle periods associated with write commands and a second inactivity time 18 for idle periods associated with read commands. Information handling system 10 is built with a variety of processing components that cooperate to process information. For example, a CPU 20 processes information in cooperation with RAM 22 and under the coordination of a chipset 24 that executes firmware, such as a BIOS. CPU 20 retrieves information from storage device 12 by issuing read input/output (I/O) commands to storage device 12 and stores information on storage device 12 by issuing write I/O commands to storage device 12. For example, an operating system executing on CPU 20 calls an application for execution by issuing a read command through chipset 24 to storage device 12 and reading the application into RAM 22. During execution of the application, CPU 20 generates information for permanent storage that is stored to storage device 12 by issuing a write command through chipset 24 and writing the information from RAM 22 to storage device 12. In the example embodiment depicted by FIG. 1, storage device 12 is a solid state drive (SSD) having non-volatile memory 24, such as integrated circuits of flash memory, that provides permanent storage under the direction of a storage manager 26 that executes on a controller or other type of processor. In alternative embodiments, storage device 12 is a hard disk drive (HDD) having a magnetic disk that spins relative to a head to read and write information.

During normal operations, storage device 12 receives I/O commands and communicates information through a SATA bus 28 and communicates management information through a management bus 30. Power manager 14 monitors a variety of factors to set an inactivity time used by an inactivity timer 32. If inactivity timer 32 detects an idle state at storage device 12 for the inactivity time, then power manager 14 commands a power down state. For example, power manager 14 determines an idle state by a lack of I/O commands received at storage device 12 storage manager 26 and commands a power down state by powering down components within storage device 12 that are not needed to detect an end of the idle state and to initiate a transition from the reduced power state to a normal operating state. In a solid state drive, a reduced power state might power down non-volatile memory 24 and other components. In a hard disk drive, a reduced power state might power down rotation of the magnetic disk. Recovery time of a solid state drive from a reduced power state is typically less than recovery time of a hard disk drive from a reduced power state because the hard disk drive generally requires power up and rotation of the magnetic disk for re-entry to a normal operating state. Since hard disk drives and solid state drives generally have different levels of power consumption and different recovery times, inactivity times for balanced operation of performance and power consumption will typically differ for hard disk drives versus solid state drives, however, each type of drive operating in accordance with the present disclosure will vary the inactivity time based upon I/O commands to achieve a desired balance operation.

One factor used by power manager 14 to set an inactivity time of inactivity timer 32 is the type of I/O commands received at storage device 12. Typically, storage devices receive more read commands than write commands, such as twice as many read commands. Read commands typically arrive at a storage device in bursts, such as might happen when a processor calls an application for execution. Thus, power manager 14 uses a read inactivity time 18 when I/O command activity at the storage device is characterized by read commands and a write inactivity time 16 when I/O command activity at the storage device is characterized by write commands. For example, a longer inactivity time is used for read activity relative to write activity because the bursty nature of host reads indicates that a read command is more likely to be followed by additional commands than is a write command. Using a longer inactivity time for read commands helps to maintain system performance by keeping storage device 12 in an operational state to operate on following commands. Using a shorter inactivity time for write commands helps to reduce power consumption by allowing a transition to a reduced power state more quickly than when I/O commands are characterized by read commands since write commands are less likely to be followed by additional commands than are read commands.

Power manager 14 characterizes I/O commands as associated with reads versus writes in a variety of ways. In one embodiment, power manager 14 selects read inactivity time 18 for use by inactivity timer 32 if the last I/O command was a read command, and selects write inactivity time 16 for use by inactivity timer 32 if the last I/O command was a write command. In alternative embodiments, the inactivity time is selected based upon a ratio of read to write commands received at storage device 12 over a time period. Other embodiments analyze I/O commands in alternative ways and may use alternative I/O commands. In one embodiment, power manager 14 applies a power state of the host system received through management bus 30 to determine the inactivity time. For example, a shorter inactivity time might be applied if CPU 20 is throttled or if the host is in a sleep reduced power state. In another embodiment, an inactivity time manager 34 adjusts the values of read inactivity time 18 and write inactivity time 16 based on historical performance, such as a history of idle times that follow entry to a reduced power state the storage device 12. For example, if a relatively high number of transitions to and from a reduced power state are detected, the inactivity times are increased to provide improved system performance.

Figure 2:
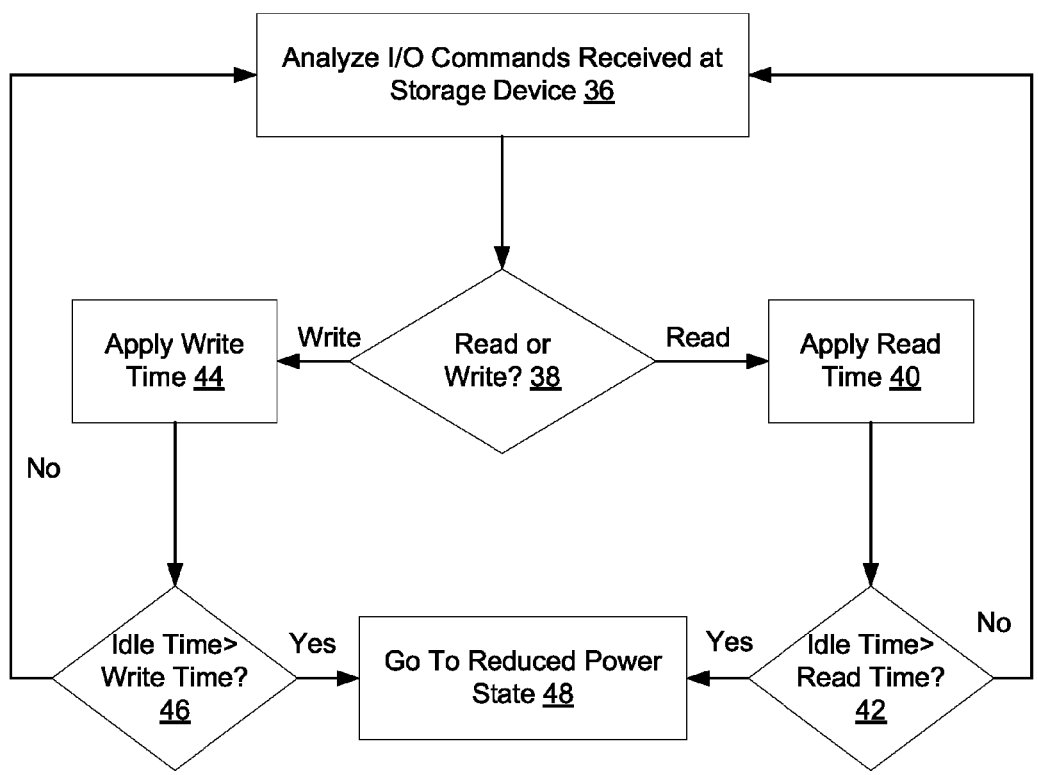
FIG. 2 depicts a flow diagram of a process for transitioning a storage device to a reduced power state based upon I/O commands received at the storage device.

Referring now to FIG. 2, a flow diagram depicts a process for transitioning a storage device to a reduced power state based upon I/O commands received at the storage device. The process begins at step 36 with analysis of I/O commands issued from a host information handling system and received at the storage device. For example, I/O commands are characterized as read commands if the last command received at the storage device is a read command or if a set of commands received at the storage device has greater than a predetermined ratio of read versus write commands. Alternatively, I/O commands are characterized as write commands if the last command received at the storage device is a write command or if a set of commands received at the storage device has less than a predetermined ratio of read versus write commands. At step 38 a determination is made of whether to use an inactivity time associated with read commands or write commands. If an inactivity time associated with read commands is used, the process continues to step 40 to apply the read inactivity time to an inactivity timer. At step 42, an idle time detected at the storage device, such as the time that has passed since the last I/O command, is compared with the read inactivity time. If the idle time is less than the read inactivity time, the process returns to step 36. If at step 38 the inactivity time is associated with write commands, then the process continues to step 44 to apply the write inactivity time to an inactivity timer. At step 46, an idle time detected at the storage device, such as the time that has passed since the last I/O command, is compared with the write inactivity time. If the idle time is less than the write inactivity time, the process returns to step 36. If at step 46 or step 42 the idle time is greater than or equal to the write or read inactivity time respectively, then the process continues to step 48 to command a transition to a reduced power state. The storage device remains in the reduced power state until a transition is commanded back to an operational state, such as in response to an I/O command received from the host information handling system.

Although the present invention has been described in detail, it should be understood that various changes, substitutions and alterations can be made hereto without departing from the spirit and scope of the invention as defined by the appended claims.

What is claimed is:

1. An information handling system comprising:
a processor operable to process information;
memory interfaced with the processor and operable to store information;
a chipset interfaced with the processor and having firmware operable to coordinate communication between the processor and one or more devices using I/O commands; and
a storage device interfaced with processor and chipset, the storage device operable to perform plural functions including at least a write function to write information and a read function to read information, each function initiated by an associated I/O command including at least a write command to write information and a read command to read information, the storage device having a power manager, the power manager initiating power down states at the storage device if no I/O commands are received at the storage device for a predetermined time period, power manager initiating a power down state after a first time period if the last I/O command is a write command and initiating a power down state after a second time period if the last I/O command is a read command, wherein the first and second time periods are not equal to each other.

2. The information handling system of claim 1 wherein the storage device comprises a hard disk drive and the I/O commands comprise write commands to write information to the hard disk and read commands to read information from the hard disk drive.

3. The information handling system of claim 1 wherein the storage device comprises a solid state drive and the I/O commands comprise write commands to write information to the solid state drive and read commands to read information from the solid state drive.

4. The information handling system of claim 3 wherein the power manager comprises an inactivity timer, the power manager initiating a power down state at the solid state drive if the inactivity timer reaches a first time value for write commands and a second time value for read commands.

5. The information handling system of claim 3 wherein the power manager comprises an inactivity timer, the power manager initiating a power down state at the solid state drive if the inactivity timer reaches a first inactivity time value for a first ratio of write commands to read commands and a second inactivity time value for a second ratio of write commands to read commands.

6. The information handling system of claim 3 wherein the power manager is further operable to monitor power down state transitions to adjust the first and second time periods.

7. The information handling system of claim 6 wherein the power manager is further operable to monitor a sleep time of the solid state drive to adjust the first and second time periods.

8. The information handling system of claim 1 wherein the first and second time periods comprise a power state of the processor.

9. A method for managing power consumption of a storage device, the method comprising:
monitoring commands issued to the storage device;
analyzing the commands to select an inactivity time from at least two possible inactivity times, including at least a first inactivity time if the last command was a read command and a second inactivity time if the last command was a write command;
determining that the selected inactivity time has passed without a command issued to the storage device; and in response to the determining, transitioning the storage device to a reduced power state.

10. The method of claim 9 wherein the storage device comprises a hard disk drive.

11. The method of claim 9 wherein the storage device comprises a solid state drive.

12. The method of claim 9 wherein analyzing the commands further comprises:
selecting a first inactivity time if the commands comprise at least a predetermined factor of write commands; and
selecting a second inactivity time if the commands comprise at least a predetermined factor of read commands.

13. The method of claim 12 wherein the predetermined factor of write commands comprises a write command as the last command issued to the storage device.

14. The method of claim 12 wherein the predetermined factor of read commands comprises a read command as the last command issued to the storage device.

15. The method of claim 12 wherein the predetermined factor of read commands comprises a predetermined ratio of read commands versus write commands issued to the storage device.

16. The method of claim 12 wherein the predetermined factor of write commands comprises a predetermined ratio of read commands versus write commands issued to the storage device.

17. The method of claim 12 wherein the second inactivity time is greater than the first inactivity time.

18. A storage device comprising:
a non-volatile memory operable to store information;
a storage manager interfaced with the non-volatile memory and operable to read information from the non-volatile memory and write information to the non-volatile memory, the storage manager reading and writing information in response to read and write commands received at an interface;
a power manager interfaced with the storage manager, the power manager operable to initiate a powered down state at the storage device after an inactivity time passes without a receiving a read or write command; and
an inactivity time manager operable to set at least a first or second inactivity time for use by the power manager, the inactivity time manager sets a first inactivity time if the last command received at the storage device is a read command and a second inactivity time if the last command received at the storage device is a write command.

19. The storage device of claim 18 wherein the inactivity time manager sets a first inactivity time if a previous predetermined set of commands received at the storage device has a first ratio of read commands versus write commands and sets a second inactivity time if a previous predetermined set of commands received at the storage device has a second ratio of read commands versus write commands.

* * * * *